US007175200B1

(12) United States Patent  
Obershan

(10) Patent No.: US 7,175,200 B1  
(45) Date of Patent: Feb. 13, 2007

(54) PROTECTIVE MOTORCYCLE IMPACT CAGE

(75) Inventor: Tracy Glenn Obershan, Aurora, IL (US)

(73) Assignee: Tracy G Oberstian, Aurora, IL (US)

( * ) Notice: Subject to any disclaimer, the term of this patent is extended or adjusted under 35 U.S.C. 154(b) by 71 days.

(21) Appl. No.: 10/731,576

(22) Filed: Dec. 9, 2003

(51) Int. Cl.  
B60R 21/13 (2006.01)

(52) U.S. Cl. ................... 280/756; 280/755

(58) Field of Classification Search ............... 280/756, 280/783, 781, 784, 796, 748, 755; 180/218; B60R 21/13  
See application file for complete search history.

(56) References Cited

U.S. PATENT DOCUMENTS

| 1,473,956 | A | * | 11/1923 | Eyre et al. ............... 280/288.4 |
| 3,561,785 | A | * | 2/1971 | Kidder ....................... 280/756 |
| 4,227,717 | A |   | 10/1980 | Bouvier |
| 4,311,335 | A |   | 1/1982 | Winiecki |
| 4,673,190 | A |   | 6/1987 | Ahlberg |
| 5,094,313 | A | * | 3/1992 | Mauws ..................... 180/210 |
| 5,257,671 | A |   | 11/1993 | Watkins |
| D377,158 | S |   | 1/1997 | Grimaldi |
| 5,743,561 | A |   | 4/1998 | Kim |
| 6,142,253 | A | * | 11/2000 | Mueller et al. ............. 180/219 |
| 6,764,099 | B2 | * | 7/2004 | Akiyama et al. ........... 280/784 |

FOREIGN PATENT DOCUMENTS

AU          9530558 A   *   3/1996

* cited by examiner

Primary Examiner—Paul N. Dickson  
Assistant Examiner—Tiffany L. Webb

(57) ABSTRACT

A protective motorcycle impact cage is provided, comprising a rear bumper, a rear bar, a passenger bar, a left upright rear shoulder bar, a right upright rear shoulder bar, a waistline bar, a bottom brace, a left top brace, a right top brace, an operator bar, a left side bar, a right side bar, a front bumper, a left front shoulder bar, and a right front shoulder bar. The protective motorcycle impact cage has particular utility in connection with protecting a motorcycle operator and passenger in a collision with a vehicle from any direction.

20 Claims, 5 Drawing Sheets

PROTECTIVE MOTORCYCLE IMPACT CAGE

BACKGROUND OF THE INVENTION

1. Field of the Invention

The present invention relates to a protective motorcycle impact cage for use in connection with motorcycle riding. The protective motorcycle impact cage has particular utility in connection with protecting a motorcycle operator and passenger in a collision with a vehicle from any direction.

2. Description of the Prior Art

Protective motorcycle impact cages are desirable for protecting a motorcycle operator and passenger in a collision with a vehicle from any direction.

The use of safety devices for motorcycles and other vehicles is known in the prior art. For example, U.S. Pat. No. 5,257,671 to Watkins discloses a vehicle with a frame encompassing a driver compartment. However, the Watkins '671 patent does not provide a protective cage suitable for protecting a motorcycle operator and passenger in a collision with a vehicle.

U.S. Pat. No. 5,743,561 to Kim discloses a light motorcycle roll bar. However, the Kim '561 patent does not provide a protective cage suitable for protecting a motorcycle operator and passenger in a collision with a vehicle.

U.S. Pat. No. 4,227,717 to Bouvier discloses a motorcycle safety device. However, the Bouvier '717 patent does not provide a protective cage suitable for protecting a motorcycle operator and passenger in a collision with a vehicle.

U.S. Pat. No. 4,673,190 to Ahlberg discloses a protective bar assembly for a motorcycle. However, the Ahlberg '190 patent does not provide a protective cage suitable for protecting a motorcycle operator and passenger in a collision with a vehicle.

U.S. Pat. No. 4,311,335 to Winiecki discloses a crash resistant motorcycle. However, the Winiecki '335 patent does not provide a protective cage suitable for protecting a motorcycle operator and passenger in a collision with a vehicle.

Lastly, U.S. Pat. No. Des. 377,158 to Grimaldi discloses a cover for the rear of a motorcycle. However, the Grimaldi '158 patent does not provide protection for a motorcycle operator and passenger in a collision with a vehicle.

While the above-described devices fulfill their respective, particular objectives and requirements, the aforementioned patents do not describe a protective motorcycle impact cage that protects a motorcycle operator and passenger in a collision with a vehicle from any direction. The prior art patents make no provision for protection from an impact from any direction.

Therefore, a need exists for a new and improved protective motorcycle impact cage that can be used for protecting a motorcycle operator and passenger in a collision with a vehicle from any direction. In this regard, the present invention substantially fulfills this need. In this respect, the protective motorcycle impact cage according to the present invention substantially departs from the conventional concepts and designs of the prior art, and in doing so provides an apparatus primarily developed for the purpose of protecting a motorcycle operator and passenger in a collision with a vehicle from any direction. The interrelated elements of the protective motorcycle impact cage of the present invention provide a greater degree of protection than any apparatus in the prior art.

SUMMARY OF THE INVENTION

In view of the foregoing disadvantages inherent in the known types of motorcycle safety devices now present in the prior art, the present invention provides an improved protective motorcycle impact cage, and overcomes the above-mentioned disadvantages and drawbacks of the prior art. As such, the general purpose of the present invention, which will be described subsequently in greater detail, is to provide a new and improved protective motorcycle impact cage and method which has all the advantages of the prior art mentioned heretofore and many novel features that result in a protective motorcycle impact cage which is not anticipated, rendered obvious, suggested, or even implied by the prior art, either alone or in any combination thereof.

To attain this, the present invention essentially comprises a protective motorcycle impact cage, comprising a rear bumper, a rear bar connected to the rear bumper, a passenger bar connected to the rear bar, a waistline bar connected to the passenger bar, a bottom brace connected to the passenger bar, an operator bar connected to the brace, a left side bar connected to the operator bar, a right side bar connected to the operator bar, and a front bumper connected to the side bars.

In one embodiment, the present invention comprises a protective motorcycle impact cage, comprising a rear bumper, a rear bar connected to the rear bumper, a passenger bar connected to the rear bar, an upright rear shoulder bar connected to the passenger bar, a waistline bar connected to the passenger bar and the upright rear shoulder bar, a bottom brace connected to the passenger bar, a top brace connected to the passenger bar, an operator bar connected to the braces, a left side bar connected to the operator bar, a right side bar connected to the operator bar, a front bumper connected to the side bars, a left front shoulder bar connected to the operator bar and the front bumper, and a right front shoulder bar connected to the operator bar and the front bumper.

In another embodiment, the present invention comprises a protective motorcycle impact cage, comprising a rear bumper, a rear bar connected to the rear bumper, a passenger bar connected to the rear bar, a left upright rear shoulder bar connected to the passenger bar, a right upright rear shoulder bar connected to the passenger bar, a waistline bar connected to the passenger bar and the upright rear shoulder bars, a bottom brace connected to the passenger bar, a left top brace connected to the passenger bar, a right top brace connected to the passenger bar, an operator bar connected to the braces, a left side bar connected to the operator bar, a right side bar connected to the operator bar, a front bumper connected to the side bars, a left front shoulder bar connected to the operator bar and the front bumper, and a right front shoulder bar connected to the operator bar and the front bumper.

The protective motorcycle impact cage of the present invention is a specially designed bumper system for motorcycle riders and passengers. This apparatus provides a protective impact cage or shield around the bike to provide physical protection for the occupants. It is designed to greatly reduce the chances of a serious injury or death in a crash from the front, rear, or either side.

The tubular steel structure of the protective motorcycle impact cage intertwines with standard components on the motorcycle while extending the main body of the bike. The steel structure is designed to provide protection to the occupants of the cycle, while integrating and harmonizing with most typical current and future motorcycle engines and functional parts. The tubular steel is strategically positioned and aligned to provide the best possible resistance to head-on, side, and overturning impacts. The tubular steel is designed to provide the strength and rigidity needed to withstand and deflect these kinds of collision forces.

The protective motorcycle impact case surrounds the occupants of a cycle at the hip and waist area. It extends beyond the width and length of the riding area, so that in a collision, the impact of another vehicle or object strikes the particular structural member that is extended from the bike. The product is designed to withstand the impact of a vehicle and minimize deformation of the structure, thus protecting the occupants from broken limbs.

In one embodiment, the protective motorcycle impact cage comprises eight primary sections. The first rounded section comprises a rear bumper used at the rear end of the bike to accept rear-end impact from other vehicles. It is strategically located at the height of most common automobiles. During an impact from behind, this curved, horizontal section of tubing is strong enough to displace the cycle forward before it collapses or deforms.

The second portion of the protective motorcycle impact cage comprises a rear bar that protects the backs of the occupants from impacts from behind. Left and right upright rear shoulder bars extended from the rear bar protect against impact from a vehicle bumper positioned above average height, such as that of a truck. This section also assists the first section with displacing the total assembly rather than experiencing a collapse from a rear-end collision.

The third section comprises a waistline bar that surrounds the passenger of a bike at waistline height while the individual is seated at the rear of the cycle. It receives side impacts from either side at the rear half of the structure. This section is designed to displace the cycle system before collapsing or deformation occurs.

Section four of the protective motorcycle impact cage comprises a passenger bar that plays a critical role in the protection and resistance to side impact collisions. This length of tubing is positioned laterally, located between the passenger and the operator of the bike. The position and location for this tubing member allows for the most compressibility resistance as the section is positioned parallel to the forces received from an impact. This section also joins and reinforces the third section.

The fifth section of the protective motorcycle impact cage comprises a bottom brace that is located at the very center of the apparatus. This longitudinal steel tube is designed to provide the greatest compression resistance to a head-on or rear-end collision impact, as it is positioned parallel to the potential forces. It also provides protection and support for the operator of the cycle in a head-on or rear-end collision, as it is located beneath the operator. In one embodiment, this section is one of the thickest and most rigid sections of the entire structure.

The sixth section of the protective motorcycle impact cage comprises an operator bar that is aligned parallel with the fourth section. These two sections are joined together by section five, the bottom brace which is aligned perpendicular and centered between the two sections. In one embodiment, left and right top braces also connect sections six and four, the operator bar and passenger bar. Section six, like section four, is used to provide compression resistance to a side-impact collision. The sixth section also serves as a restraint to the operator during a head-on collision in the same manner as section four does for a passenger.

The seventh section of the protective motorcycle impact cage comprises a side bar aligned parallel to the cycle engine on each side. It is designed to protect the body of the engine as well as absorb the sources of a side impact collision at the front half of the cycle. This section is also designed to reinforce the last section, which is at the very front of the protective motorcycle impact cage. It aids in resisting and absorbing the forces from a head-on impact collision.

The eighth and final portion of the protective motorcycle impact cage comprises a front bumper located in the very front of the structure, serving as a front bumper for the motorcycle. This rounded section is curved around and extended beyond the front end of the bike to receive the impact from a front end collision. It is angled downward slightly so it would deform before the sixth or seventh sections collapse or deform. This front section provides some resistance to a head-on collision as it redirects forces of impact away from the occupants of the motorcycle. This section is located at the height of a typical automobile bumper. Left and right upright front shoulder bars connecting sections six and eight also add stability to the structure and increase resistance to collisions.

If a motorcycle is involved in a collision, the protective motorcycle impact cage helps to absorb forces and lessen the impact on the rider and passenger, thus reducing the possibility of injury or death in the mishap. This apparatus is ideally suited for new production motorcycles, although it also has utility for aftermarket applications.

The protective motorcycle impact cage of the present invention fulfills the need for impact protection for motorcyclists. The appealing features of the protective motorcycle impact cage include its safety, automatic protection, and the peace of mind it provides for motorcyclists. Instead of bikers being subjected to direct collisions with other vehicles and objects, this tubular steel cage or shield provides automatic protection. It helps to absorb forces while insulating and protecting the riders, thereby reducing the possibility of serious injury or death in a crash. This product provides protection from every angle around the machine, and may even help to reduce insurance costs for riders. In addition, the protective motorcycle impact cage is very strong, reliable, cost-effective, and adaptable to virtually any motorcycle design.

The protective motorcycle impact cage is designed to provide a similar level of safety to a motorcyclist that a compact or sports car provides to occupants during a collision. This increases the odds of a cyclist surviving a collision. The protective motorcycle impact cage reduces the amount of direct impact force received by occupants of a motorcycle in a collision, and decreases the amount of bodily harm received by the occupants of a motorcycle in a collision. By using existing established motorcycle design criteria for performance and safety, the product can utilize existing motorcycle manufactured parts and processes to control cost and practicality. The weight of the product harmonizes with existing 550 cc. 600 cc. 750 cc, and 1100 cc size cycle engines, allowing the performance level of these cycles to be proportionally maintained.

The protective motorcycle impact cage protects, cushions, and restrains the occupants of the cycle from the total forces received from a collision impact with an object while providing an equal level of performance with the standard and high performance modern day motorcycles in the market as well as a high level of comfort for riders. The design expands the recent trend of tubular steel used in modem motorcycles, and intertwines with standard cycle components while extending beyond and surrounding the occupants of the cycle. The structural body bumper system serves as an inner perimeter resistance to forces parallel to the structural system.

In one embodiment, the protective motorcycle impact cage of the present invention also comprises a safety shell structure that encompasses the body bumper structure, the occupants of the cycle, and the operating components of the cycle. The safety shell structure serves as a buffer for protection and is also designed to interlock with the body bumper system. The safety shell structure primarily protects the upper half of the occupants and the cycle.

The body bumper is designed to withstand the impact of a vehicle and minimize deformation of the structure, thus protecting riders from broken limbs. The use of tubular steel is a practical application that has been in use in cycle designs since the 1950s. The eight substructures of the body bumper structure are designed to protect curtain parts of the occupants' bodies against impacts from different angles and situations. In certain embodiments, the present invention additionally comprises a safety shell structure designed to function as an individual structure unit, and also to interconnect and reinforce the body bumper structure. The intersection of these two structural units are connected at key axial points to provide the most structurally sound total structure.

The safety shell structure is designed to protect the occupancy of the cycle in areas that the body bumper may not cover. If the cycle receives an impact from the waist level and above, the safety shell structure is design to protect the rider. If the cycle receives an impact from overhead such as from a falling object, the safety shell structure also serves as a safety element to protect the rider.

In one embodiment, the shell structure is a tubular steel structure that is narrower in diameter than the body bumper and lighter in weight since it is designed to protect against collisions that are much less frequent and receive lesser forces than those at the waist level of the riders and below the waist height point of the cycle. The safety shell structure is also designed for protection if the cycle is overturned to an upside down position.

The lighter weight of the safety shell structure with respect to the body bumper is designed to act like a pendulum system as the safety shell structure and the body bumper are connected together. The lighter weight of the safety shell structure is canceled out by the heavier weight of the body bumper when the cycle is attempting to maneuver to and from a tilt position, and to and from an upright position. The interior of the Shell Structure is designed to allow the occupants of the cycle enough space to move freely, yet the structure will provide a snug fit in certain areas with cushioning around the structure for the purpose of cushioned restraint against collisions.

In one embodiment, the shell structure comprises six sections identified from rear to front in the following description. The first two shell structure sections are identical left and right sections that join together at the center. The second two shell structure sections are also identical, and are positioned at left and right shoulders of the riders, and the third two shell structure sections are similar and are positioned in the middle section of the cycle structure.

A first shell structure section comprises a tubular band that wraps around the midsection of the shell and cycle, and may comprise two identical sections as outlined above, a right half and a left half or it may comprise one continuous section. This portion of the structure serves as a protective band around the passengers of the cycle at the midsection height of the passengers and the cycle, and intersects and connects with the second two shell structure sections, on the right hand side and on the left hand side, both at the rear end and at the front end of the shell structure. This first portion also intersects with the third pair of sections at the rear portion of the middle section and at the front portion of the middle section of the shell structure. The first portion is designed to enforce the interconnection of the total shell structure, and in one embodiment takes about a 171 degree incline from front to rear to protect the upper midsection of the passengers, including the hips, lower rib cage knees and elbows.

In this embodiment, the second two shell structure sections run the length of the cycle, side by side over the right and left shoulders of the passengers of the cycle to protect the upper bodies of the passengers in the event the cycle is overturned in a collision. These sections help to bond the total shell structure together and add structural support to the interconnecting sections, and also act as a restraining device for passengers when a rear end or front end collision occurs.

The third two shell structure sections are designed for overhead protection and side impact protection, and in this embodiment comprise an upside down U shape as one section is positioned over the rear passenger at the point that divides the rear and middle sections, and the other is positioned over the front passenger at the point that divides the middle and front sections. The rear section intersects and connects to the first two sections and the second two sections, as well as the third and fourth body bumper sections described above. These sections intersect and connect together to establish a more solid rear section of the total structure with the body bumper and shell structure combined. The front section intersects and connects with the first two sections and the second two sections, as well as the sixth and seventh body bumper sections described above. These sections intersect and connect together to establish a more solid front section of the total structure with the body bumper and shell structure combined.

In one embodiment, the protective motorcycle impact cage comprises a rear bumper, a rear bar connected to the rear bumper, a passenger bar connected to the rear bar, a waistline bar connected to the passenger bar, a bottom brace connected to the passenger bar, an operator bar connected to the brace, a left side bar connected to the operator bar, a right side bar connected to the operator bar, and a front bumper connected to the side bars.

In another embodiment, the protective motorcycle impact cage comprises a rear bumper, a rear bar connected to the rear bumper, a passenger bar connected to the rear bar, an upright rear shoulder bar connected to the passenger bar, a waistline bar connected to the passenger bar and the upright rear shoulder bar, a bottom brace connected to the passenger bar, a top brace connected to the passenger bar, an operator bar connected to the braces, a left side bar connected to the operator bar, a right side bar connected to the operator bar, a front bumper connected to the side bars, a left front shoulder bar connected to the operator bar and the front bumper, and a right front shoulder bar connected to the operator bar and the front bumper.

In still another embodiment, the protective motorcycle impact cage comprises a rear bumper. a rear bar connected to the rear bumper, a passenger bar connected to the rear bar, a left upright rear shoulder bar connected to the passenger bar, a right upright rear shoulder bar connected to the passenger bar, a waistline bar connected to the passenger bar and the upright rear shoulder bars, a bottom brace connected to the passenger bar, a left top brace connected to the passenger bar, a right top brace connected to the passenger bar, an operator bar connected to the braces a left side bar connected to the operator bar, a right side bar connected to the operator bar, a front bumper connected to the side bars, a left front shoulder bar connected to the operator bar and the front bumper, and a right front shoulder bar connected to the operator bar and the front bumper.

In certain embodiments, the connections comprise welds. In some embodiments, the protective motorcycle impact cage comprises tubular metal. In various embodiments, the protective motorcycle impact cage comprises steel.

There has thus been outlined, rather broadly, the more important features of the invention in order that the detailed description thereof that follows may be better understood and in order that the present contribution to the art may be better appreciated.

The invention may also include a motorcycle and a safety shell structure. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved protective motorcycle impact cage that has all of the advantages of the prior art motorcycle safety devices and none of the disadvantages.

It is another object of the present invention to provide a new and improved protective motorcycle impact cage that may be easily and efficiently manufactured and marketed.

An even further object of the present invention is to provide a new and improved protective motorcycle impact cage that has a low cost of manufacture with regard to both materials and labor, and which accordingly is then susceptible of low prices of sale to the consuming public, thereby making such protective motorcycle impact cage economically available to the buying public.

Still another object of the present invention is to provide a new protective motorcycle impact cage that provides in the apparatuses and methods of the prior art some of the advantages thereof, while simultaneously overcoming some of the disadvantages normally associated therewith.

Even still another object of the present invention is to provide a protective motorcycle impact cage for a motorcycle operator and passenger. This allows motorcycle riding with an improved degree of protection.

Still yet another object of the present invention is to provide a protective motorcycle impact cage for protecting a motorcycle operator and passenger from an impact from any direction. This makes it possible to survive an impact with a reduced likelihood of injury.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
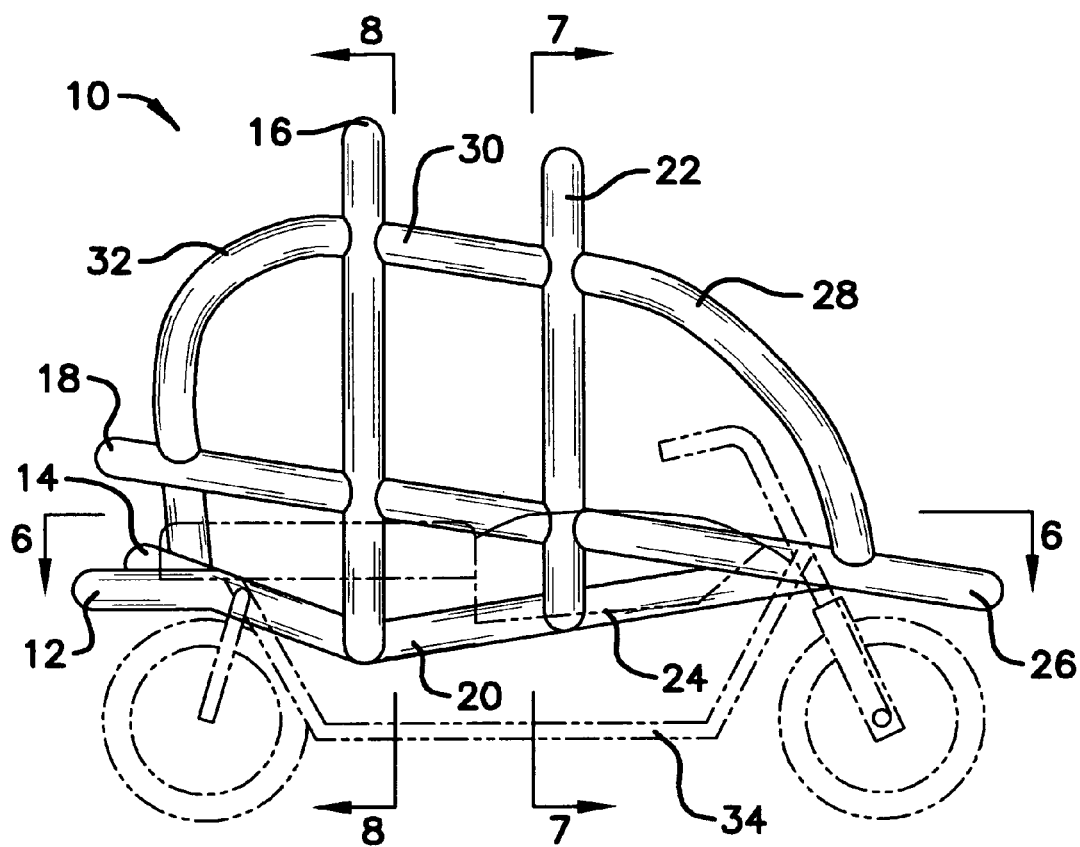
FIG. 1 is a right elevational view of the preferred embodiment of the protective motorcycle impact cage constructed in accordance with the principles of the present invention.

Referring now to the drawings, and particularly to FIGS. 1—8, a preferred embodiment of the protective motorcycle impact cage of the present invention is shown and generally designated by the reference numeral 10.

In FIG. 1, a new and improved protective motorcycle impact cage 10 of the present invention for protecting a motorcycle operator and passenger in a collision with a vehicle from any direction is illustrated and will be described. More particularly, in this embodiment a motorcycle 34 is outfitted with the protective motorcycle impact cage 10 comprising a rear bumper 12, a rear bar 14 connected to the rear bumper 12, a passenger bar 16 connected to the rear bar 14, left and right upright rear shoulder bars 32 connected to the passenger bar 16, a waistline bar 18 connected to the passenger bar 16 and the upright rear shoulder bars 32, a bottom brace 20 connected to the passenger bar 16, left and right top braces 30 connected to the passenger bar 16, an operator bar 22 connected to the bottom brace 20 and the top braces 30, left and right side bars 24 connected to the operator bar 22, a front bumper 26 connected to the side bars 24, and left and right front shoulder bars 28 connected to the operator bar 22 and the front bumper 26.

Figure 2:
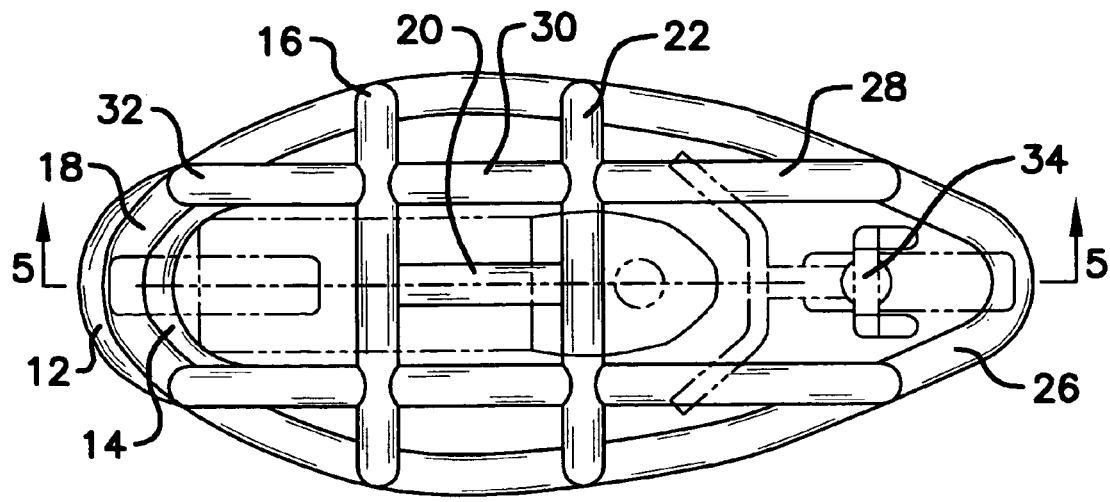
FIG. 2 is a plan view of the protective motorcycle impact cage of the present invention.

FIG. 2 is a plan view of the protective motorcycle impact cage of the present invention, and illustrates the rear bumper 12, rear bar 14, passenger bar 16, left and right upright rear shoulder bars 32, waistline bar 18, bottom brace 20, left and right top braces 30, operator bar 22, front bumper 26, and left and right front shoulder bars 28 encompassing a motorcycle 34.

Figure 3:
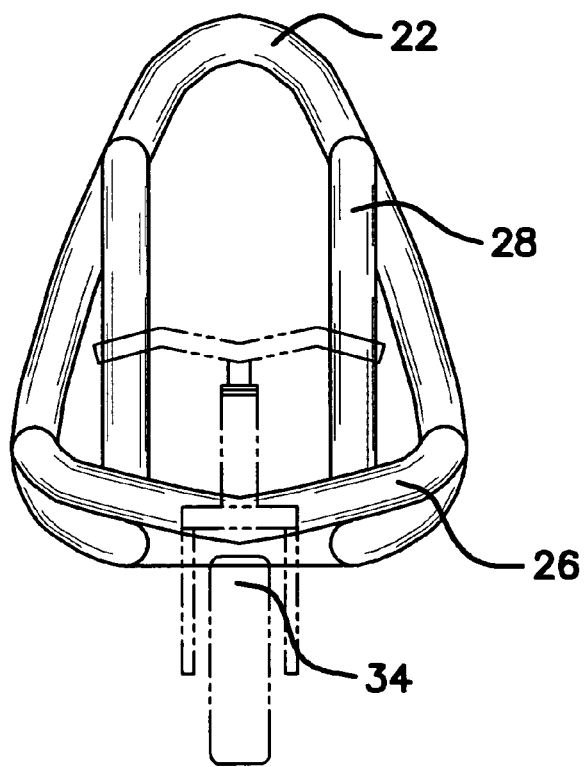
FIG. 3 is a front elevational view of the protective motorcycle impact cage of the present invention.

FIG. 3 is a front elevational view of the protective motorcycle impact cage of the present invention, and illustrates a motorcycle 34 with an operator bar 22, front bumper 26, and left and right front shoulder bars 28.

Figure 4:
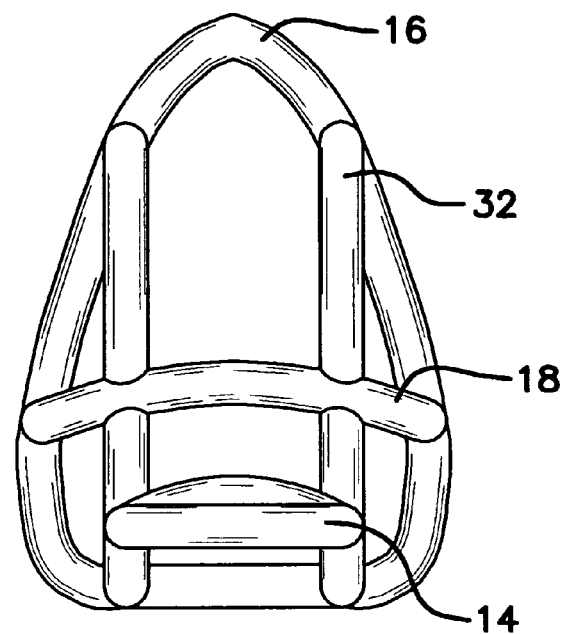
FIG. 4 is a rear elevational view of the protective motorcycle impact cage of the present invention.

FIG. 4 is a rear elevational view of the protective motorcycle impact cage of the present invention, and illustrates the rear bar 14, passenger bar 16, left and right upright rear shoulder bars 32, and waistline bar 18.

Figure 5:
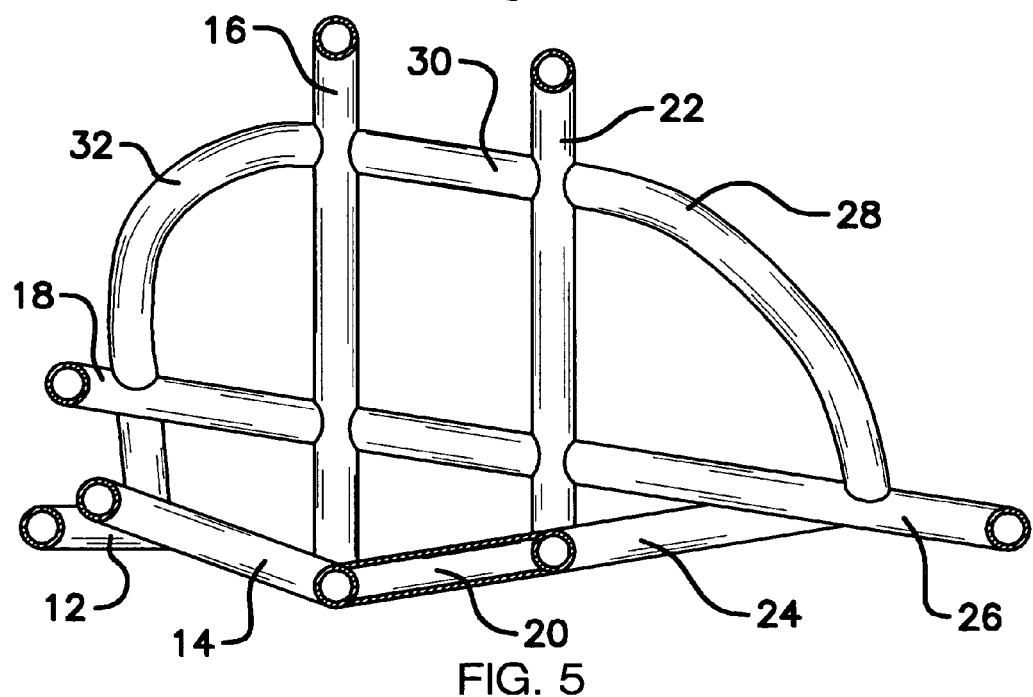
FIG. 5 is a right elevational cross-sectional view of the protective motorcycle impact cage of the present invention illustrated in FIG. 2 and taken along the line 5—5.

FIG. 5 is a right elevational cross-sectional view of the protective motorcycle impact cage of the present invention, and illustrates a rear bumper 12, a rear bar 14 connected to the rear bumper 12, a passenger bar 16 connected to the rear bar 14, an upright rear shoulder bar 32 connected to the passenger bar 16, a waistline bar 18 connected to the passenger bar 16 and the upright rear shoulder bar 32, a bottom brace 20 connected to the passenger bar 16, a top brace 30 connected to the passenger bar 16, an operator bar 22 connected to the bottom brace 20 and the top brace 30, a side bar 24 connected to the operator bar 22, a front bumper 26 connected to the side bar 24, and a front shoulder bar 28 connected to the operator bar 22 and the front bumper 26.

Figure 6:
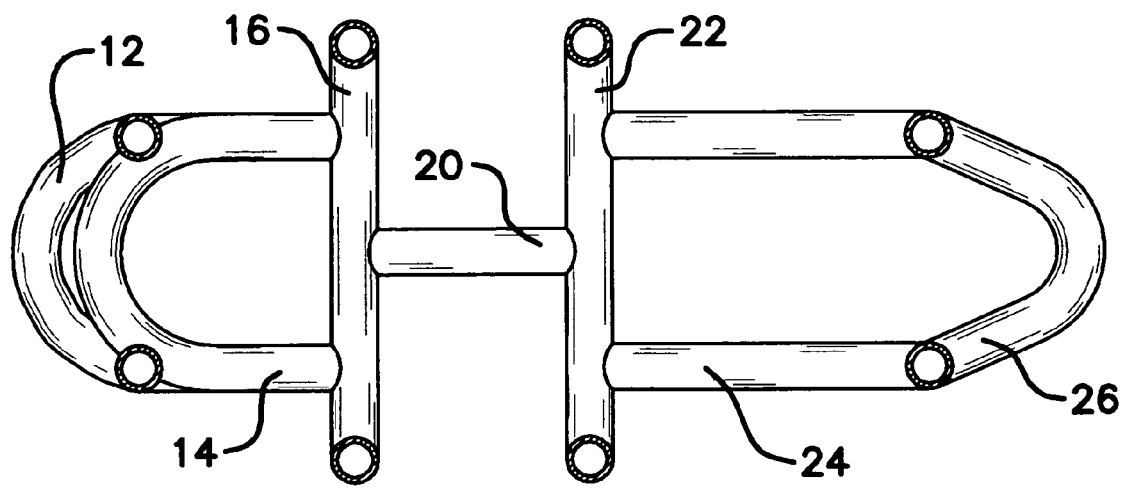
FIG. 6 is a cross-sectional plan view of the protective motorcycle impact cage of the present invention illustrated in FIG. 1 and taken along the line 6—6.

FIG. 6 is a cross-sectional plan view of the protective motorcycle impact cage of the present invention, and illustrates the rear bumper 12, rear bar 14, passenger bar 16, bottom brace 20, operator bar 22, side bars 24, and front bumper 26.

Figure 7:
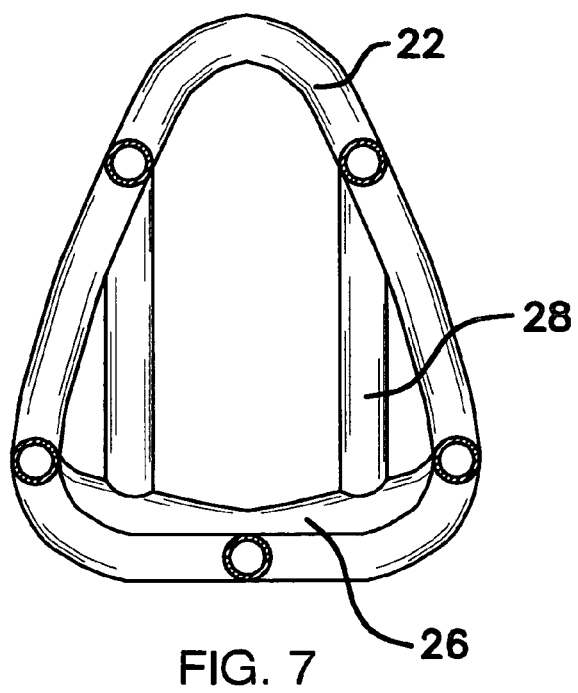
FIG. 7 is a rear elevational cross-sectional view of the protective motorcycle impact cage of the present invention illustrated in FIG. 1 and taken along the line 7—7.

FIG. 7 is a rear elevational cross-sectional view of the protective motorcycle impact cage of the present invention, and illustrates the operator bar 22, front bumper 26, and left and right front shoulder bars 28.

Figure 8:
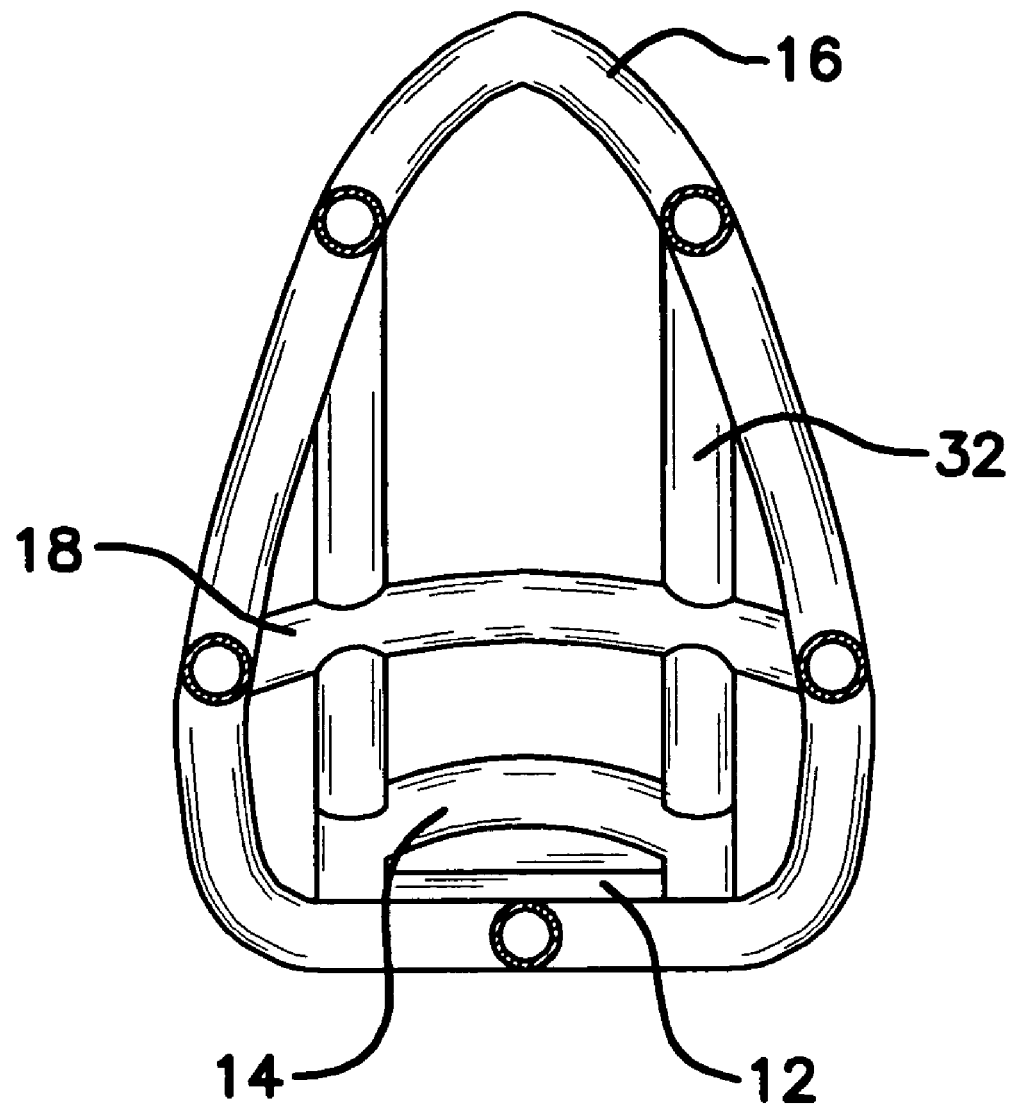
FIG. 8 is a front elevational cross-sectional view of the protective motorcycle impact cage of the present invention illustrated in FIG. 1 and taken along the line 8—8.

FIG. 8 is a front elevational cross-sectional view of the protective motorcycle impact cage of the present invention, and illustrates the rear bumper 12, rear bar 14, passenger bar 16, left and right upright rear shoulder bars 32, and waistline bar 18.

In use, it can now be understood that the protective motorcycle impact cage of the present invention has particular utility in connection with protecting a motorcycle operator and passenger in a collision with a vehicle from any direction.

While a preferred embodiment of the protective motorcycle impact cage has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as any metal or composite material may be used instead of the steel described. Also, the safety shell structure may be made of fiberglass, heavy-duty plastic, metal, composite material, or similar material. And although protecting a motorcycle operator and passenger in a collision with a vehicle from any direction has been described, it should be appreciated that the protective motorcycle impact cage herein described is also suitable for protection of other vehicle drivers. Furthermore, a wide variety of structures may be used instead of that described. In addition, it is to be understood that the various described embodiments may be combined.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A protective motorcycle impact cage, comprising:
   a rear bumper;
   a rear bar connected to said rear bumper;
   a passenger bar connected to said rear bar;
   a waistline bar connected to said passenger bar;
   a bottom brace connected to said passenger bar;
   an operator bar connected to said brace;
   a left side bar connected to said operator bar;
   a right side bar connected to said operator bar; and
   a front bumper connected to said side bars, wherein said protective motorcycle impact cage is substantially elliptical in cross-section.

2. The protective motorcycle impact cage of claim 1, further comprising a front shoulder bar connected to said operator bar and said front bumper.

3. The protective motorcycle impact cage of claim 1, further comprising a top brace connecting said passenger bar to said operator bar.

4. The protective motorcycle impact cage of claim 1, further comprising an upright rear shoulder bar connecting said passenger bar and said waistline bar.

5. The protective motorcycle impact cage of claim 1, further comprising a motorcycle having a front wheel and a rear wheel, wherein said protective motorcycle impact cage extends beyond said front wheel and said rear wheel.

6. The protective motorcycle impact cage of claim 1, wherein said protective motorcycle impact cage protects a motorcycle operator, a passenger, and front and rear wheels of a motorcycle in a collision with a vehicle.

7. The protective motorcycle impact cage of claim 1, wherein the connections comprise welds.

8. The protective motorcycle impact cage of claim 1, wherein said protective motorcycle impact cage is made from tubular metal.

9. A protective motorcycle impact cage, comprising:
   a rear bumper;
   a rear bar connected to said rear bumper;
   a passenger bar connected to said rear bar;
   an upright rear shoulder bar connected to said passenger bar; a waistline bar connected to said passenger bar and said upright rear shoulder bar;
   a bottom brace connected to said passenger bar;
   a top brace connected to said passenger bar;
   an operator bar connected to said braces;
   a left side bar connected to said operator bar;
   a right side bar connected to said operator bar;
   a front bumper connected to said side bars;
   a left front shoulder bar connected to said operator bar and said front bumper; and a right front shoulder bar connected to said operator bar and said front bumper, wherein said protective motorcycle impact cape is substantially elliptical in cross-section.

10. The protective motorcycle impact cage of claim 9, further comprising a motorcycle having a front wheel and a rear wheel, wherein said protective motorcycle impact cape extends beyond said front wheel and said rear wheel.

11. The protective motorcycle impact cage of claim 9, wherein said protective motorcycle impact cage protects a motorcycle operator, a passenger, and front and rear wheels of a motorcycle in a collision with a vehicle from any direction.

12. The protective motorcycle impact cage of claim 9, wherein the connections comprise welds.

13. The protective motorcycle impact cage of claim 9, wherein said protective motorcycle impact case is made from tubular metal.

14. The protective motorcycle impact cage of claim 9, wherein said protective motorcycle impact cage is made from steel.

15. A protective motorcycle impact cage, comprising:
a rear bumper;
a rear bar connected to said rear bumper;
a passenger bar connected to said rear bar;
a left upright rear shoulder bar connected to said passenger bar;
a right upright rear shoulder bar connected to said passenger bar;
a waistline bar connected to said passenger bar and said upright rear shoulder bars;
a bottom brace connected to said passenger bar;
a left top brace connected to said passenger bar;
a right top brace connected to said passenger bar;
an operator bar connected to said braces;
a left side bar connected to said operator bar;
a right side bar connected to said operator bar;
a front bumper connected to said side bars;
a left front shoulder bar connected to said operator bar and said front bumper; and
a right front shoulder bar connected to said operator bar and said front bumper, wherein said protective motorcycle impact cage is substantially elliptical in cross-section.

16. The protective motorcycle impact cage of claim 15, further comprising a motorcycle having a front wheel and a rear wheel, wherein said protective motorcycle impact cage extends beyond said front wheel and said rear wheel.

17. The protective motorcycle impact cage of claim 15, wherein said protective motorcycle impact cage protects a motorcycle operator, a passenger, and front and rear wheels of a motorcycle in a collision with a vehicle from any direction.

18. The protective motorcycle impact cage of claim 15, wherein the connections comprise welds.

19. The protective motorcycle impact cage of claim 15, wherein said protective motorcycle impact cage is made from tubular metal.

20. The protective motorcycle impact cage of claim 15, wherein said protective motorcycle impact cage is made from steel.

* * * * *